(12) United States Patent
Smith

(10) Patent No.: US 9,090,171 B2
(45) Date of Patent: Jul. 28, 2015

(54) VEHICLE IMMOBILIZER

(71) Applicant: David W. Smith, Cedar Park, TX (US)

(72) Inventor: David W. Smith, Cedar Park, TX (US)

(*) Notice: Subject to any disclaimer, the term of this patent is extended or adjusted under 35 U.S.C. 154(b) by 0 days.

(21) Appl. No.: 14/298,936

(22) Filed: Jun. 8, 2014

(65) Prior Publication Data

US 2014/0371962 A1    Dec. 18, 2014

Related U.S. Application Data

(60) Provisional application No. 61/836,604, filed on Jun. 18, 2013.

(51) Int. Cl.
| | |
|---|---|
| *B60L 11/18* | (2006.01) |
| *B60L 1/00* | (2006.01) |
| *B60L 3/00* | (2006.01) |

(52) U.S. Cl.
CPC .............. *B60L 11/1824* (2013.01); *B60L 1/00* (2013.01); *B60L 3/00* (2013.01); *B60L 11/1816* (2013.01); *B60L 11/1846* (2013.01); *B60L 2230/16* (2013.01); *B60L 2250/20* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 5,957,551 | A  * | 9/1999  | Maron et al. | 303/191 |
| 6,323,566 | B1 * | 11/2001 | Meier | 307/10.2 |
| 6,489,886 | B2 * | 12/2002 | Meier | 340/426.1 |
| 6,522,241 | B1 * | 2/2003  | Baudard | 340/5.61 |
| 6,535,107 | B1 * | 3/2003  | Bartz | 340/5.2 |
| 6,549,116 | B1 * | 4/2003  | Honda et al. | 340/5.61 |
| 6,577,227 | B1 * | 6/2003  | Kirchlinde et al. | 340/5.62 |
| 6,603,388 | B1 * | 8/2003  | Perraud et al. | 340/5.61 |
| 6,636,145 | B1 * | 10/2003 | Murakami et al. | 340/5.9 |
| 6,731,198 | B1 * | 5/2004  | Stobbe et al. | 340/10.33 |
| 6,812,824 | B1 * | 11/2004 | Goldinger et al. | 340/10.1 |
| 7,916,446 | B2 * | 3/2011  | Nerheim | 361/232 |
| 8,725,330 | B2 * | 5/2014  | Failing | 701/22 |
| 2003/0236601 | A1* | 12/2003 | McLeod et al. | 701/29 |
| 2008/0106841 | A1* | 5/2008  | Nerheim | 361/232 |
| 2009/0111648 | A1* | 4/2009  | Hecht et al. | 477/92 |
| 2010/0228405 | A1* | 9/2010  | Morgal et al. | 701/2 |
| 2010/0280700 | A1* | 11/2010 | Morgal et al. | 701/29 |
| 2013/0314205 | A1* | 11/2013 | Neupert | 340/5.2 |

* cited by examiner

*Primary Examiner* — Thomas Tarcza
*Assistant Examiner* — Alex C Dunn
(74) *Attorney, Agent, or Firm* — Pierson IP, PLLC

(57) ABSTRACT

Embodiments described herein describe an immobilization device configured to simulate the communication of safety signals of a charging cable to a charging port of an electric vehicle; such that a processor of the electric vehicle may determine that the charging state of electric vehicle is ready to charge, thus immobilizing the vehicle. In embodiments, the immobilization device may be configured to restrict the movement of the electric vehicle without supplying power to the electric vehicle, and be configured to allow the components of the electric vehicle to be utilized if the immobilization device is coupled to the charging port of the electric vehicle.

18 Claims, 2 Drawing Sheets

VEHICLE IMMOBILIZER

CROSS-REFERENCE TO RELATED APPLICATIONS

This application claims a benefit of priority under 35 U.S.C. §119 to Provisional Application No. 61/836,604 filed Jun. 18, 2013, which is fully incorporated herein by reference in its entirety.

BACKGROUND INFORMATION

1. Field of the Disclosure

Examples of the present disclosure are related to techniques for restricting a vehicle's movement or immobilizing a vehicle. More particularly, embodiments utilize safety signals of a charging port of an electric vehicle to restrict the vehicle's movement.

2. Background

Systems controlling the movement of electric and hybrid vehicles (referred to individually and collectively herein after as an "electric vehicles") are simpler than the control systems of conventional combustion based vehicles. To control the movement of the electric vehicle or the electric vehicle's components, the electric vehicle's control system determines that an owner of the electric vehicle is authorized to use the electric vehicle. The determination may be based on any number of different types of authorized keys being engaged with the electric vehicle, such as a key being engaged in a lock of the electric vehicle, a key transmitting radio-frequency key signals to the electric vehicle, or an remote key being in close proximity to the electric vehicle. Responsive to authorizing a key being engaged with the electric vehicle, the owner of the electric vehicle may place the vehicle in gear, move the electric vehicle, and/or access the vehicle's components.

Situations may arise where an authorized key is engaged with the electric vehicle but the owner of the electric vehicle does not intend for the electric vehicle to be put into motion. For example, at a car show, showroom, park, or any other location where an authorized key may be engaged with the electric vehicle enabling the vehicle's components, an unknown, undesired, unauthorized. Additionally, situations may arise where a semi-authorized person may be in the electric vehicle's driver seat, where the semi-authorized person has been approved to access at least one of the vehicle's components but has not been approved to move the electric vehicle. While the semi-authorized person is in the electric vehicle's driver seat, this person may move the electric vehicle. Further, in other situations, a person in the electric vehicle's driver seat may not know that the electric vehicle can currently be moved, and may accidently put in gear and place the electric vehicle into motion, potentially leading to accidents.

Accordingly, needs exists for more effective and efficient methods and system to immobilize an electric vehicle while allowing access to the electric vehicle's components if wherein access may be granted to the electric vehicle's components it is determined that an authorized key is engaged with the electric vehicle.

SUMMARY

Conventionally, if a charging cable of a charging station is coupled to the charging port of the electric vehicle, power may be supplied from the charging station to the electric vehicle. Responsive to interfacing the charging cable with the charging port, safety signals may be transmitted by a processor of the charging station, and received by a processor of the electric vehicle to change a charging state of the electric vehicle from passive to ready to charge.

In embodiments, if the charging state of the electric vehicle is in the passive charging state, then the electric vehicle may be moved. Whereas, if the electric vehicle is in the ready to charge or fully enabled charging state, the electric vehicle may be immobilized. Furthermore, the ready to charge charging state may be emulate any protocol that may immobilize the vehicle. For example, the ready to charge state may include signals transmitted between the charging port and the processor of the vehicle emulating charging the vehicle. However, the ready to charge charging state may be associated with the immobilization device transmitting any signals for any protocol that may immobilize the vehicle.

Embodiments disclosed herein provide systems and methods to limit, reduce, or immobilize the movement of an electric vehicle. Embodiments disclosed herein may be configured to simulate safety signals communicated between a charging port of the electric vehicle and a charging cable of a charging station. The communicated signals may immobilize the electric vehicle while providing access to the electric vehicle's components.

Embodiments describe an immobilization device configured to emulate the safety signals communicated between the charging cable and the charging port to immobilize the electric vehicle when the electric vehicle is not coupled to a charging port. The immobilization device may be configured to interface with the charging port of the electric vehicle, and may be configured to communicate safety signals to the processor of the electric vehicle to change the charging state of the electric vehicle from passive to ready to charge, which may emulate a situation of a charging cable being positioned within a charging port of the electric vehicle. Therefore, by changing the charging state of the electric vehicle from passive to ready to charge, via the immobilization device, the electric vehicle may be immobilized.

While the immobilization device is interfaced with the charging port of the electric vehicle, the immobilization device may be configured to change the charging state of the electric vehicle from passive to ready to charge, wherein the immobilization device may immobilize the vehicle while not supplying power to the electric vehicle. The ready to charge state may indicate that the immobilization device is inserted within the charging port of the electric vehicle, which may emulate signals transmitted upon a charging cable being inserted into the charging port. The ready to charge state may be initiated by the immobilization device being inserted into the charging port, wherein responsive to the ready to charge state being initiated the charging port may communicate signals to the electric vehicle's processor to immobilize the vehicle. In embodiments, the signals transmitted associated with the ready to charge state may be any or all signals that, from a safety perspective, immobilize the electric vehicle.

In embodiments, if the electric vehicle's charging state is ready to charge and an authorized key is engaged with the electric vehicle, then the components of the electric vehicle, such as power windows, air-conditioning, power locks, opening trunk, radio, etc. may be operable. Therefore, if the immobilization device is interfaced with the charging port of the electric vehicle and the key is in close proximity to the electric vehicle, then the electric vehicle's components may still be utilized.

In embodiments, if the immobilization device is coupled to the electric vehicle's charging port, then the electric vehicle may be immobilized and the components of the electric vehicle may be accessed.

In embodiments, the immobilization device may be configured to communicate only the safety signals with the processor of the electric vehicle, and may be configured to not communicate any other signals or power parameters, which may be conventionally transmitted between a charging station and the electric vehicle. In implementations, the immobilization device may be configured to communicate the safety signals with the processor of the electric vehicle along with other signals or parameters.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
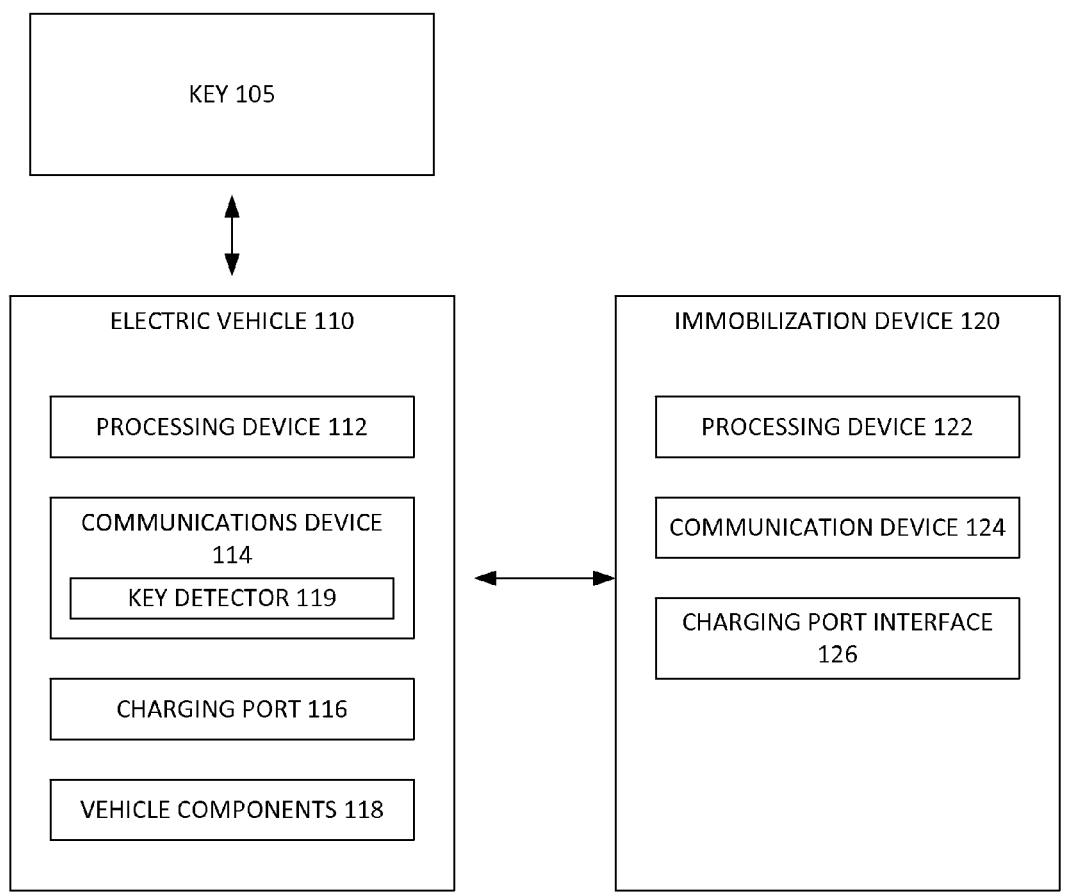
FIG. 1 depicts a topology of a system to immobilize an electric vehicle, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages. In embodiments, the computer program code may be downloaded computer program code that is received from a remote location and stored in the computer-readable medium. The downloaded computer program code may be received from a wired or wireless connection over a network. The network may be a wired or wireless network such as the Internet, an intranet, a LAN, a WAN, a cellular network or another type of network. It will be understood that the network may be a combination of multiple different kinds of wired or wireless networks.

Embodiments may receive the computer program code from physical computing devices residing at a particular location or deployed in a cloud computing network environment. In this embodiments, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagrams.

In embodiments, to control the movement of the electric vehicle, it may be desired or required for the electric vehicle to detect an authorized key is engaged with the electric vehicle. A key may include a plurality of different types of keys (referred to therein after individually and collectively as "key"), such as: a mechanical key to be inserted within a physical lock positioned on the electric vehicle, an remote key configured to communicate wireless communications to the electric vehicle to authorize a user of the electric vehicle, etc. In embodiments, the key may transmit and receive wireless data to authorize a user of the electric vehicle via any known standard or protocol, such as radio-frequency, blue-tooth, etc. and be configured to transmit signals over different signal mediums, such as electromagnetic, magnetic, light, sound, etc. In embodiments, an authorized key may be engaged with an electric vehicle by being physically inserted into a corresponding lock, communicating a valid password, signal, data, password, login, etc. to the electric vehicle.

If the electric vehicle does not detect that an authorized key is engaged with the electric vehicle, then the electric vehicle may be immobilized, and the components of the electric vehicle may be inoperable. In embodiments, an electric vehicle may not detect that a key is engaged with the electric vehicle if the key is not in close proximity to the electric vehicle, the key is placed in a wireless communications blocking container, such as: a lead bag, metal box, metal safe, a physical key is not disposed within a corresponding lock of the electric vehicle, etc.

An electric vehicle requires electric power to power movement and components of the electric vehicle. Conventionally, a user of the electric vehicle transports the electric vehicle to an electric vehicle charging station to charge the vehicle. While the electric vehicle charging station is providing power to the electric vehicle, additional signals are transmitted between the electric vehicle charging station and the electric vehicle causing a charging state of the electric vehicle to change to ready to charge charging state, and immobilize the electric vehicle. In embodiments, if the electric vehicle is in the ready to charge charging state, the electric vehicle may be immobilized according to industry-standard designs of electric vehicles that mandate, desire, or require that a charging electric vehicle is immobile. However, use of conventional charging stations hardware cables to be connected between a fixed charging station and the electric vehicle to achieve electric vehicle immobilization when charging power is not required, may cause safety hazards and/or be atheistically unpleasing.

Embodiments described herein are configured to utilize an immobilization device configured to allow demonstration and/or use of the components of the electric vehicle while restricting, limiting, or disabling an electric vehicle's movement.

Turning now to FIG. 1, FIG. 1 depicts one topology 100 immobilizing a vehicle. Topology 100 may include key 105, electric vehicle 110, and immobilization device 120.

Key 105 may be a small, handheld, security hardware device with built-in authentication used to control and secure access to controls of electric vehicle 110. In embodiments, key 105 may be a mechanical key being configured to be received by a lock positioned on electric vehicle 110, be a remote vehicle key configured to transmit and/or receive wireless communications to and/or from electric vehicle, be a key configured to transmit and/or receive wired communications to and/or from electric vehicle. In embodiments, an authorized key may be engaged with electric vehicle 100 to determine the owner of electric vehicle 110 by key 105 being physically inserted into a corresponding lock on the electric vehicle, transmitting radio frequency signals, other wireless and/or wired signals, such as radio frequency signals, to enable electric vehicle 110. In embodiments, if electric vehicle 100 determines an authorized key 105 is engaged with electric vehicle 110 (e.g. physically and/or wirelessly) and the charging state of the electric vehicle 110 is passive, then electric vehicle 110 may be moved. If the charging state of electric vehicle 110 is ready to charge, then electric vehicle 110 may be immobilized even if key 105 is engaged with electric vehicle 110.

However, situations may arise where an authorized key 105 is engaged with electric vehicle 110 and the charging state of the vehicle may be passive, but the owner of electric vehicle 110 does not intend for electric vehicle 110 to be put into motion. For example, the owner of electric vehicle 110 may utilize an authorized key to unlock and enable access to at least one vehicle component 118 of electric vehicle 110 but does not intend for electric vehicle 110 to be put into motion.

In embodiments, different keys 105 may be utilized to authorized different controls of electric vehicle 110. For example, a first key may be configured to authorize control the movement controls of electric vehicle 110, a second key may be configured to authorize control of the vehicle components 118 of electric vehicle 110, and/or a third key may be configured to authorize control of the movement controls of electric vehicle and the vehicle components 118 of electric vehicle 110.

Electric vehicle 110 may be an electric vehicle or a hybrid vehicle that is configured to receive power from sources of electricity that are directly connected to the electric vehicle 110 through wires. In embodiments, electric vehicle 110 may be a car, motorcycle, boat, train, truck, Jet Ski, airplane, or any other device configured to transport individuals, cargo, and/or materials, including motorized vehicles, electronic vehicles, hybrid vehicles, vehicles capable of being charged, plug-in vehicles, etc. Electric vehicle 110 may include processing device 112, communication device 114, charging port 116, vehicle components 118, and key detector 119.

Processing device 112 may include memory, e.g., read only memory (ROM) and random access memory (RAM), storing processor-executable instructions and one or more processors that execute the processor-executable instructions. In embodiments where processing device 112 includes two or more processors, the processors may operate in a parallel or distributed manner. Processing device 112 may execute an operating system of electric vehicle 110 or software associated with other components of electric vehicle 110. In embodiments, processing device 112 may be configured to determine the charging state of the electric vehicle, control the locomotion of the electric vehicle based on the charging state, and control or enable vehicle components 118 to be controlled.

Communication device 114 may be a device that allows the electric vehicle to communicate with another device via charging port 116 and/or vehicle components 118. Communication device 114 may include one or more wireless transceivers for performing wireless communication and/or one or more communication ports for performing wired communication. In embodiments, communication device 114 may include key detector 119.

Key detector 119 may be configured to determine if an authorized key 105 is engaged with electric vehicle 110. Key detector 119 may determine that authorized key 105 is engaged with electric vehicle 110 by authorized key 105 being physically inserted into a corresponding lock of electric vehicle 110, receiving wireless and/or wired communications from key 105, etc. Key detector 119 may also be configured to validate the authorized key 105 to allow access to electric vehicle 110, put electric vehicle 110 in motion, and/or access at least one of the vehicle components 118. In embodiments, key 105 may transmit signals (electromagnetic, magnetic, light, sound, or signals that may be transmitted over any other signal medium or protocol), key detector 119 may receive the transmitted signals and determine if electric 105 is in close proximity to electric vehicle 110. If key detector 119 determines that vehicle key 105 is in close proximity to electric vehicle 110 or vehicle key 105 is an authorized key engaged with electric vehicle 110, processing device 112 may validate the owner of electric vehicle and enable electric vehicle 110 to be moved and/or vehicle components 118 of electric vehicle 110 may be utilized.

Charging port 116 may be an electric vehicle conductive charging system architecture including the operational requirements and the dimensional requirements to receive and interface with a charging cable. Charging port 116 may have a plurality of pin connectors configured to transmit and/or receive safety signals, power, and control pilot signals. In embodiments, the safety signals may be configured to communicate information indicating that a device is interfaced with charging port 116. Based on a device being interfaced to charging port 116, transmitted safety signals may include information to change the charging state of electric vehicle 110 from passive to ready to charge. Responsive to the charging state of electric vehicle 110 being in the ready to charge charging state, the movement of electric vehicle 110 may be prevented, limited, or immobilized. The control pilot signals may be configured to communicate information indicating the charging level and protocols between electric vehicle 110 and the charging device or another device, as well as other information to processor 112 of electric vehicle 110.

Vehicle components 118 may be components of the electric vehicle 110. A vehicle component 118 may be any accessory, device, module of electric vehicle 110 that may be configured to operate independently of the movement of electric vehicle. Vehicle components 118 may include power windows, air-conditioning, power locks, controls to open a trunk, radio, etc.

Immobilization device 120 may be a device configured to interface with charging port 116 of electric vehicle 110 to simulate communication of safety signals and/or transmission of electric power from a charging cable. However, responsive to immobilization device 120 being interfaced with charging port 116, immobilization device 120 may only transmit the safety signals to processor 112 of electric vehicle 110 to immobilize electric vehicle 110 without transmitting the control pilot signals and/or power. One skilled in the art will appreciate that the safety signals may be associated with any protocol signal, which may be any charging protocol signal or otherwise, received by processor 112 that may immobilize electric vehicle 110.

Immobilization device 120 may be a handheld, mobile device that is configured to be transported from a first location to a second location, wherein immobilization device 120 may not be permanently connected to a fixed location and/or may not be configured to interface with another device other than charging port 116. In embodiments, immobilization device 120 may include processing device 122, communication device 124, and charging port interface 126.

Processing device 122 may include memory, e.g., read only memory (ROM) and random access memory (RAM), storing processor-executable instructions and one or more processors that execute the processor-executable instructions. In embodiments where processing device 122 includes two or more processors, the processors may operate in a parallel or distributed manner. Processing device 122 may execute an operating system of immobilization device 120 or software associated with other components of immobilization device 120.

Communication device 124 may be a device that allows immobilization device 120 to communicate with processor 112 of electric vehicle 110. Communication device 124 may include one or more wireless transceivers for performing wireless communication and/or one or more communication ports for performing wired communication.

Charging port interface 126 may be configured to interface with charging port 116 of electric vehicle 110. Charging port interface 126 may be configured to transmit and/or receive safety signals control pilot signals to or from charging port 116. Responsive to interfacing charging port interface 126 with charging port 116, safety signals may be communicated between processor 112 of electric vehicle 110 and processor 122 of immobilization device 120 to change a charging state of electric vehicle 110 from passive to ready to charge. In embodiments, when immobilization device 120 is coupled with charging port interface 126, charging port interface 126 may simulate the communication of safety signals of a charging cable to charging port 116, such that processor 112 of electric vehicle 110 may determine the charging state of electric vehicle 110 is ready to charge based on the communicated signals. In embodiments, charging port interface 126 may be configured to communicate only the safety signals with processor 112 of the electric vehicle 110, and not any other signals or information, such as the pilot control signals or electric power. Therefore, charging port interface 126 may immobilize electric vehicle 110 without pins or connections associated with the pilot control signals or power being engaged.

In embodiments, if immobilization device 120 is decoupled from charging port 116, then processor 112 of electric vehicle 110 may determine that immobilization device 120 is no longer coupled to charging port 116 and change the charging state of electric vehicle 110 from ready to charge to passive, wherein the vehicle may be mobilized. Yet, while immobilization device 120 is interfaced with the charging port 116 of electric vehicle 110, the charging state of electric vehicle 110 may be changed from passive to ready to charge. Thus, immobilizing electric vehicle 110 without supplying power to electric vehicle 110, pilot control signals, power and/or any other information unassociated with safety signals.

In embodiments, if the charging state of electric vehicle 110 is ready to charge by immobilization device 120 being interfaced with charging port 116, then the components 118 of the electric vehicle 110, such as power windows, power locks, opening trunk, air conditioning, radio, etc. may be operable. In embodiments, to access components 118 of electric vehicle 110 while immobilization device 120 is interfaced with charging port 116, it may be required or desired that key detector 119 determines that authorized vehicle key 105 is engaged with electric vehicle 110 and immobilization device 120 is interfaced charging port 116 of electric vehicle 110.

Figure 2:
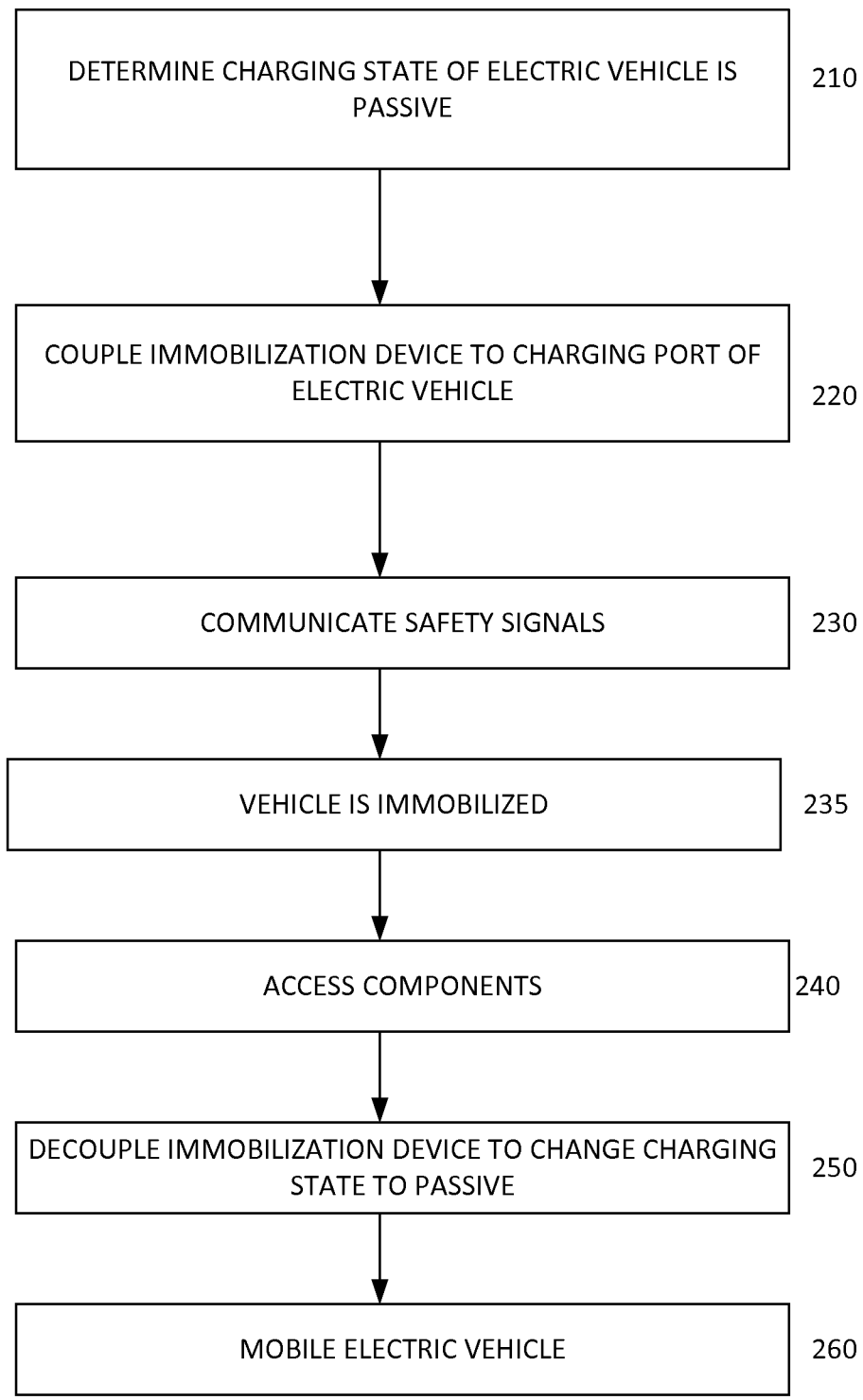
FIG. 2 depicts a method to immobilize an electric vehicle, according to an embodiment.

FIG. 2 illustrates a method 200 for immobilizing an electric vehicle utilizing an immobilization device. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information) and hardware devices. The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At operation 210, and the charging state of the electric vehicle may be passive and an authorized key of the electric vehicle may be engaged with the electric vehicle. Therefore, the electric vehicle may be mobilized by a user putting the electric vehicle in gear and/or the components of the electric vehicle may be used. Operation 210 may be performed by a key detector that is the same as or similar to key detector 119.

At operation 220, an immobilization device may be coupled to a charging port of the electric vehicle. In implementations, the immobilization device may be configured to interface with the charging port, and the immobilization device may have an interface that is substantially the same shape and/or size of a charging cable of a charging station or an adaptor for the charging cable. Operation 220 may be performed by a charging port interface and/or a charging port that are the same as or similar to charging port interface 126 and charging port 116.

At operation 230, a processor of the immobilization device and a processor of the electric vehicle may be configured to communicate safety signals. The processor of the immobilization device may transmit safety signals that are received by the processor of the electric vehicle. In implementations, a handshake may be performed between the processor of the immobilization device and the processor of the electric vehicle emulating a charging cable being secured within the charging port of the electric vehicle. The safety signals may be communicated in a handshake initiated by either the immobilization device or the processor of the electric vehicle, which may be responsive to the charging port interface of the immobilization device coupling with the safety pins of the charging port. In embodiments, the safety signals may be communicated from the immobilization device to the processor of the electric vehicle with or without at least one pilot signals, control signals, and/or power being transmitted to or received by the processor of the electric device. Operation 230 may be performed by a charging port interface and/or a charging port that is the same as or similar to charging port interface 126 and charging port 116.

At operation 235, responsive to the processor of the electric vehicle receiving a safety signal from the immobilization device, the processor of the electric vehicle may change the charging state of the electric vehicle from passive to ready to charge. Responsive to the charging state of the electric vehicle being ready to charge, the electric vehicle may be immobilized. Operation 235 may be performed by a processor that is the same as or similar to processor 112, in accordance with one or more implementations.

At operation 240, if the electric vehicle's charging state is ready to charge and the immobilization device is interfaced with the charging port then the electric vehicle is immobilized, components of the electric vehicle may be operable. Accordingly, a user of electric vehicle may be able to use the components of the electric vehicle to view how the components of the electric vehicle operate, without being able to move the electric vehicle. Operation 240 may be performed by a processor that is the same as or similar to processor 112, in accordance with one or more implementations.

At operation 250, the immobilization device may be removed from the charging port of the electric vehicle. Responsive to the immobilization device being removed from the charging port of the electric vehicle, the processor of the electric vehicle may determine or receive a signal from immobilization device or the charging port that the charging state of the electric vehicle is passive. Operation 250 may be performed by a processor that is the same as or similar to processor 112, in accordance with one or more implementations At operation 260, if the charging state of the electric vehicle is passive and an authorized key corresponding to the movement controls of the electric vehicle is engaged with the electric vehicle, then the electric vehicle may be put into gear and moved.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for immobilizing a vehicle, the system comprising:
   a processor configured to determine a charging state of the vehicle, wherein when the charging state of the vehicle is ready to charge then the vehicle is immobilized;
   a charging port configured to be disposed within the vehicle;
   an immobilization device including a charging port interface configured to be coupled with the charging port, the charging port interface being configured to communicate signals to the processor through the charging port to change the charging state of the vehicle to ready to charge, wherein when the charging state of the vehicle is passive the vehicle is mobile.

2. The system of claim 1, wherein the charging port interface is configured to simulate that the vehicle is being charged without charging the vehicle.

3. The system of claim 1, further comprising:
   at least one component of the vehicle, wherein the at least one component of the vehicle is operable when the charging port interface is coupled to the charging port.

4. The system of claim 3, wherein the at least one component of the vehicle includes power windows, air-conditioning, power locks, opening a trunk, and a radio.

5. The system of claim 1, further comprising:
   an authorized key configured to authenticate a user of the vehicle responsive to determining that the authorized key is engaged with the vehicle, wherein the charging port interface is configured to immobilize the vehicle when the authorized key is engaged with the vehicle.

6. The system of claim 5, wherein the authorized key configured to be physically or wirelessly engaged with the vehicle.

7. The system of claim 1, wherein the signals communicated from the charging port interface are configured to change the charging state of the vehicle from passive to ready to charge.

8. The system of claim 1, wherein responsive to decoupling the charging port interface from the charging port, the charging state of the vehicle is changed from ready to charge to passive.

9. The system of claim 1, wherein the charging port interface is configured to transmit the signals to the processor without transmitting power signals.

10. A method for immobilizing a vehicle, the method comprising:
 determining a charging state of the vehicle, wherein when the charging state of the vehicle is ready to charge then the vehicle is immobilized;
 coupling a charging port interface, positioned on a mobile immobilization device, with the charging port for the vehicle;
 communicating signals from the charging port interface to the processor through the charging port;
 changing the charging state of the vehicle to ready to charge, wherein when the charging state of the vehicle is passive the vehicle is mobile.

11. The method of claim 10, further comprising:
 simulating that the vehicle is being charged via the signals without charging the vehicle.

12. The method of claim 10, further comprising:
 operating at least one component of the vehicle when the charging port interface is coupled to the charging port.

13. The method of claim 12, wherein the at least one component of the vehicle includes power windows, air-conditioning, power locks, opening a trunk, and a radio.

14. The method of claim 10, further comprising:
 authenticating a user of the vehicle responsive to determining that an authorized key is engaged with the vehicle, wherein the charging port interface is configured to immobilize the vehicle when the authorized key is engaged with the vehicle.

15. The method of claim 14, wherein the authorized key is configured to be physically or wirelessly engaged with the vehicle.

16. The method of claim 10, further comprising:
 changing the charging state of the vehicle from passive to ready to charge responsive to the signals being communicated from the charging port interface.

17. The method of claim 10, further comprising:
 changing the charging state of the vehicle from ready to charge to passive responsive to decoupling the charging port interface from the charging port.

18. The method of claim 10, further comprising:
 transmitting the signals to the processor without transmitting power signals.

* * * * *